United States Patent
Hirairi

(10) Patent No.: US 6,480,942 B1
(45) Date of Patent: Nov. 12, 2002

(54) SYNCHRONIZED FIFO MEMORY CIRCUIT

(75) Inventor: Koji Hirairi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/320,720

(22) Filed: May 27, 1999

(30) Foreign Application Priority Data

May 28, 1998 (JP) .......................................... 10-147317

(51) Int. Cl.$^7$ ............................................... G06F 12/00
(52) U.S. Cl. ............. 711/156; 365/189.07; 365/189.08; 710/56; 710/310; 711/204; 711/219
(58) Field of Search ....................... 365/189.07, 189.08; 710/56, 57, 310; 711/133, 134, 137, 154, 156, 159, 167, 204, 219

(56) References Cited

U.S. PATENT DOCUMENTS

| | | | | |
|---|---|---|---|---|
| 5,471,583 A | * | 11/1995 | Au et al. ................ | 365/189.01 |
| 5,745,731 A | * | 4/1998 | Kim et al. .................... | 710/57 |
| 5,805,930 A | * | 9/1998 | Rosenthal et al. ............ | 710/57 |
| 5,898,893 A | * | 4/1999 | Alfke ........................... | 710/57 |
| 5,974,482 A | * | 10/1999 | Gerhart ....................... | 710/52 |
| 6,041,370 A | * | 3/2000 | Guyt ............................ | 710/57 |
| 6,226,698 B1 | * | 5/2001 | Yeung et al. ............... | 365/239 |
| 6,263,410 B1 | * | 7/2001 | Kao et al. .................... | 710/57 |

* cited by examiner

Primary Examiner—Matthew Kim
Assistant Examiner—Christian P. Chace
(74) Attorney, Agent, or Firm—Rader. Fishman, & Grauer PLLC; Ronald P. Kananen, Esq.

(57) ABSTRACT

A synchronized FIFO memory circuit includes a random access memory and a FIFO controller having a decreased critical-path length. The synchronized FIFO circuit comprises a first counter for counting a number representing a Read Pointer, a second counter for counting a number representing a Write Pointer, a third counter for holding and managing the number of remaining empty entries in the FIFO memory circuit, and comparison means for comparing the value of the third counter with a constant value. Write Ready, Read Ready, Full, Empty, Almost Full and Almost Empty which are status signals of the FIFO memory circuit are produced at a high speed by comparison carried out by the comparison means without using a subtractor.

23 Claims, 15 Drawing Sheets

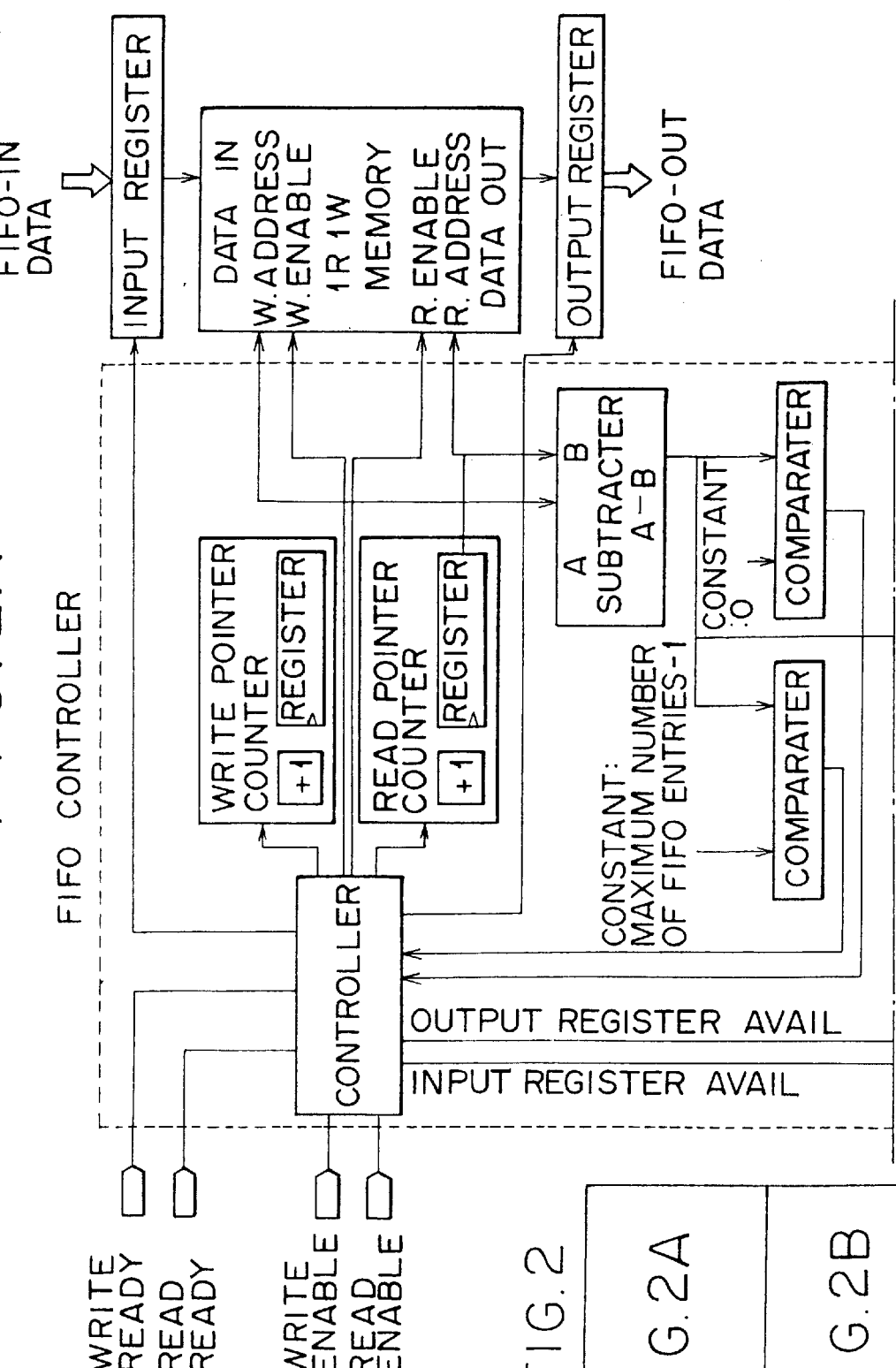

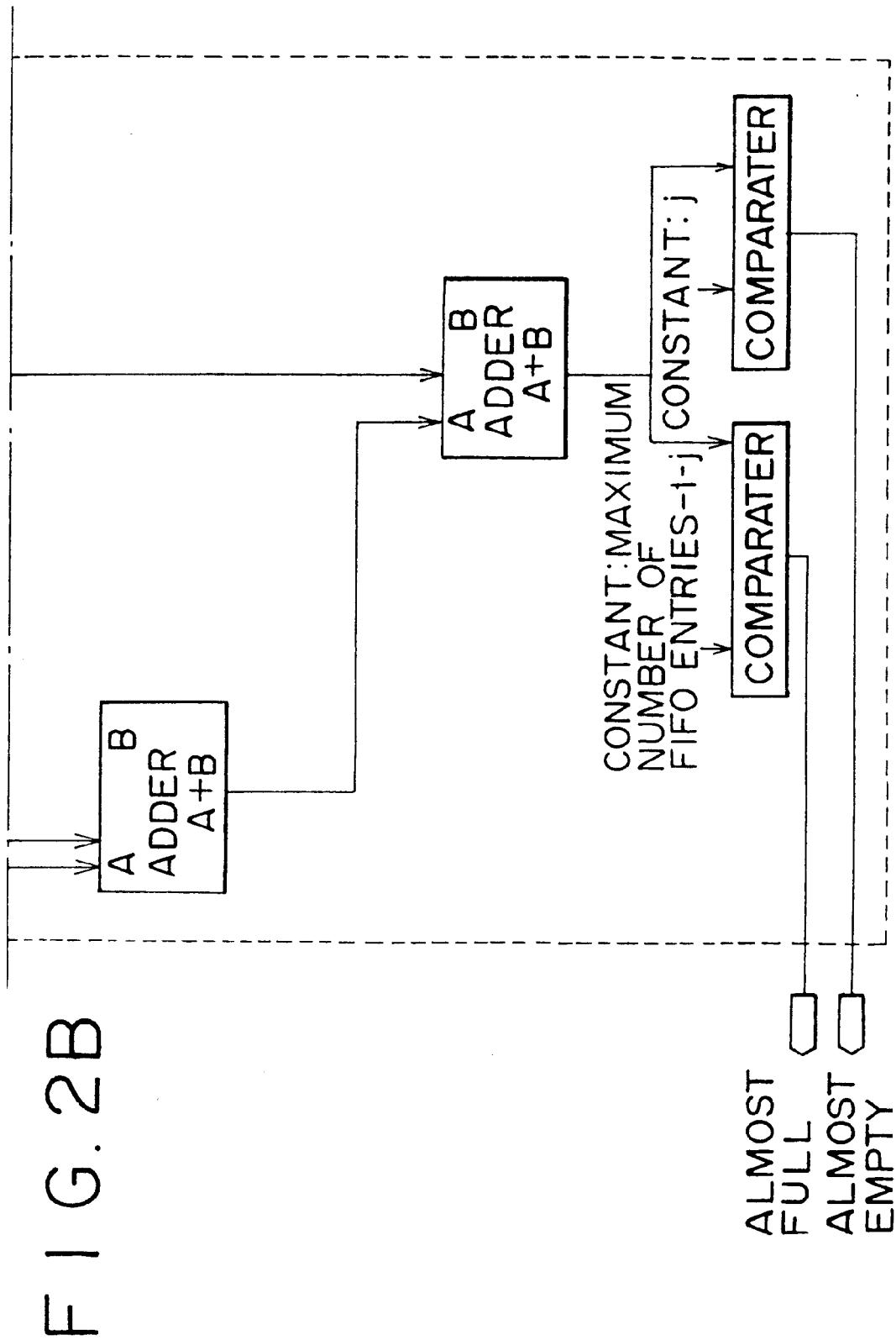

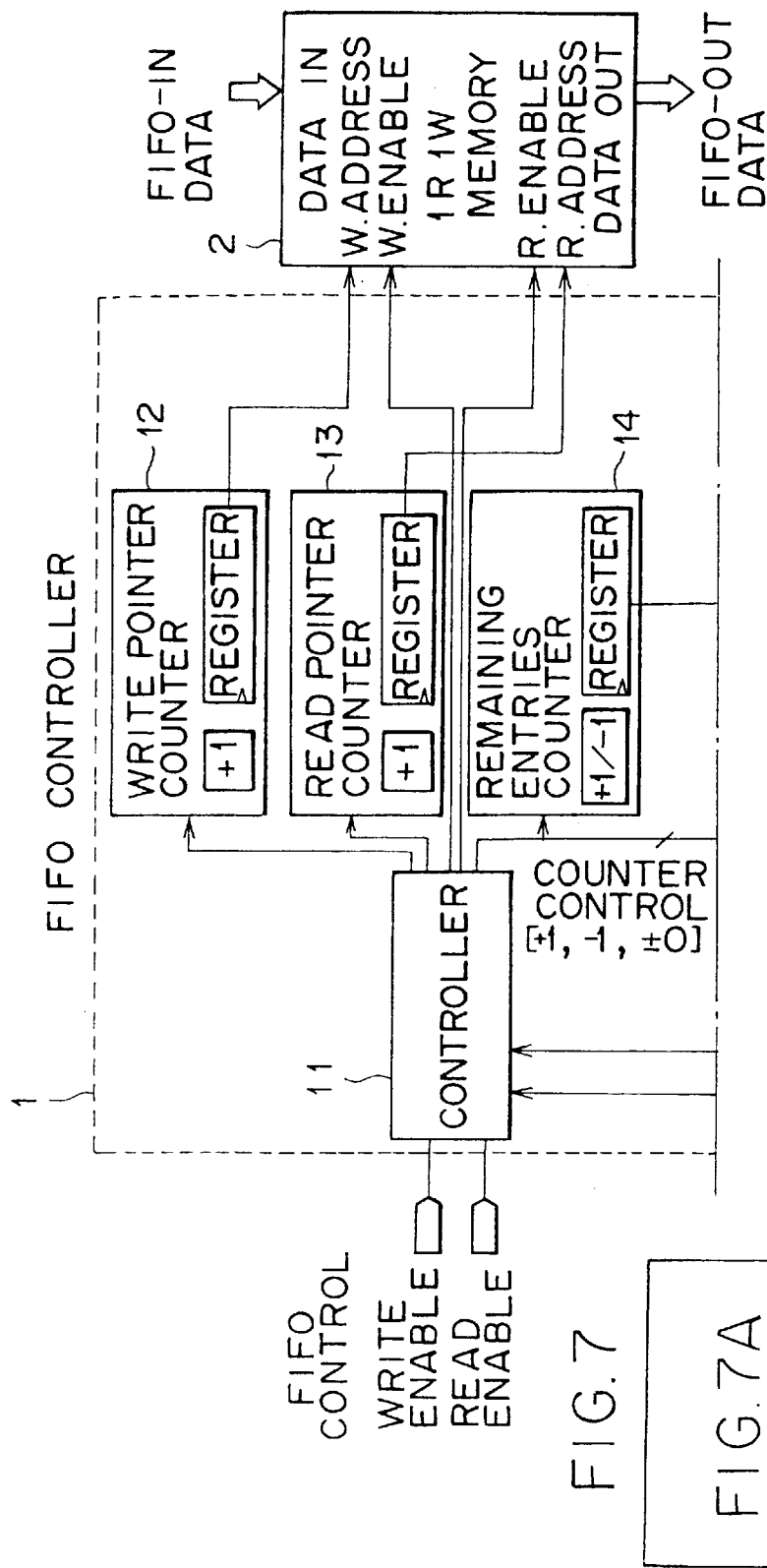

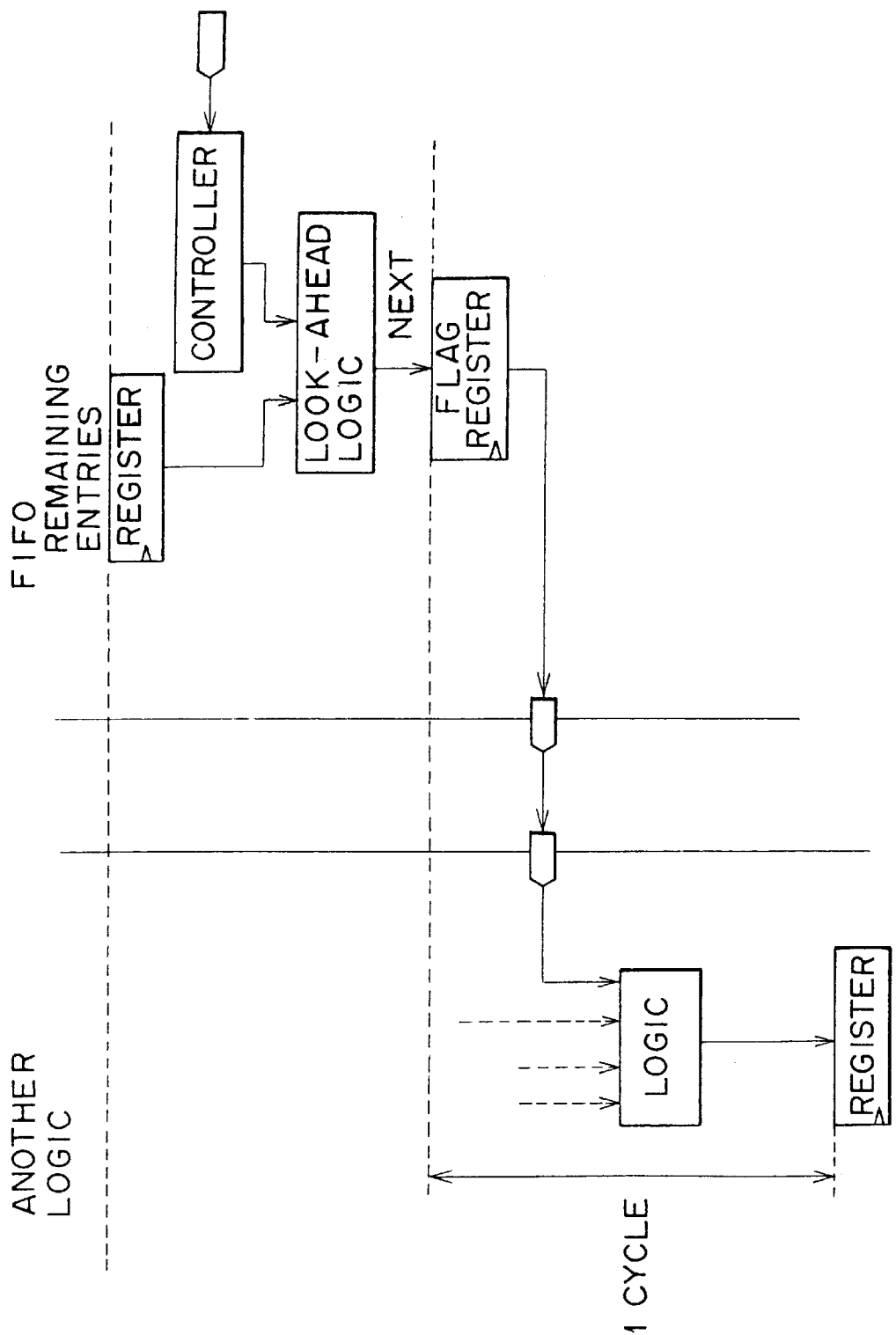

SYNCHRONIZED FIFO MEMORY CIRCUIT

BACKGROUND OF THE INVENTION

This invention relates to a FIFO (First-In First-Out) memory circuit, and more particularly, to a synchronized FIFO memory circuit.

The term FIFO is an acronym for a First-In/First-Out memory, meaning a memory outputting data which was inputted first.

The FIFO is a functional storage device that is interposed between two apparatuses wherein data produced in a time series from one of the apparatuses is inputted to the other apparatus. The FIFO is placed between the two apparatuses as a memory buffer for absorbing a difference in processing speed and/or processing timing between the two apparatus.

Generally, FIFO memories are roughly divided into two types depending upon the configuration of a storage element of the FIFO.

One of the FIFO memories employs a random access memory as a storage element. In order to allow a random access memory to operate as a FIFO, it is combined with a FIFO controller to construct a FIFO. As a random access memory, an SRAM or a register file is used. The FIFO controller is a sequential circuit that includes a write pointer, i.e. a register indicating a write position for input data and a read pointer, i.e. a register indicating a read position for output data.

The other one of the FIFO memories employs a shift register including a plurality of registers connected at the same plurality of stages. The registers have a sequential relationship among them and transfer all pieces of data at a time from each register nearer to the input to an adjacent register nearer to the output.

Further, the FIFO memories are roughly divided into two types from a functional point of view.

One of the FIFO memories is generally called an asynchronous FIFO with the write timing and the read timing thereof different from each other. Writing is performed in synchronism with a signal called a write clock, and reading is performed in synchronism with a signal called a read clock.

The other one of the FIFO memories is generally called a synchronized FIFO with the write timing and the read timing thereof matching each other. Writing and reading are performed in response to a common input clock. A write enable signal and a read enable signal determine whether writing should be or should not be performed and whether reading should be or should not be performed respectively.

1) FIFO with no Input/Output Registers

A block diagram of a conventional synchronized FIFO of the random access memory type and a FIFO controller thereof is shown in FIG. 1.

Referring to FIG. 1, a block denoted by 1R1W MEMORY is a typical 1-read/1-write random access memory having no input register and no output register. The 1-read/1-write random access memory has data input/output terminals, a write address input terminal/read address input terminal and a write enable (Write Enable) signal input terminal/read enable (Read Enable) signal input terminal.

The FIFO controller controls write/read addresses and write/read enable signals to cause the random access memory to operate as a FIFO. For this reason, the FIFO controller includes a Write Pointer Counter for holding and updating a write address and a Read Pointer Counter for holding and updating a read address.

Generally, two kinds of operation, namely, writing and reading, are performed on the FIFO. For this reason, the FIFO controller has a Write Enable signal input for requesting writing and a Read Enable signal input for requesting reading. Further, the FIFO controller has signals indicating status of the FIFO. The status signals are a Full signal output indicating whether or not a write operation is enabled (a write operation is disabled when Full==0) and an Empty signal output indicating whether or not a read operation is enabled (a read operation is disabled when Empty==1). Or, since a write operation is enabled when Full==0 and a read operation is enabled when Empty==0, the FIFO controller may output a signal of Write Ready (=~Full) or Read Ready (=~Empty). The signals are all managed by the FIFO controller.

The Write Pointer (hereinafter referred to as a WP) indicates a position into which input data is to be written, and the Read Pointer (hereinafter referred to as an RP) indicates a position from which data is to be read out. If the WP and the RP indicate the same position, this represents that no valid entry (a register in which data is stored) is present. In this instance, the Empty signal is 1.

The number of valid entries is the number of pieces of valid data present in the FIFO and is given by (WP−RP). This, however, is limited to a case wherein the maximum number of entries in the FIFO is $2^n$ (where n is a natural number).

The number of entries that can be stored in the FIFO may be equal to the maximum number of entries, or may be equal to the maximum number of entries −1, depending upon the manner of control of the FIFO. When as many pieces of data as all entries are simply written into the FIFO at a point of time, then a WP=RP state is reached at the point of time, and this full state cannot be distinguished from the condition of an empty FIFO. Accordingly, a 1-bit register needs to be provided separately to allow discrimination between the Empty and Full states of the FIFO depending upon whether or not WP=RP.

Another method is available wherein WP=RP−1 is regarded as a condition of a full FIFO. In this instance, $$WP=RP+n-1(mod\ n)=RP-1(mod\ n)$$

where the symbol n represents the maximum number of entries, and the number of entries that can be stored in the FIFO is given by the maximum number of entries −1. Here, RP+1−n(mod n) signifies a remainder that is obtained when RP+n−1 is divided by n. Similarly, RP-1(mod n) is a remainder that is obtained when RP-1 is divided by n. The transformation of the expression above is obvious. In FIG. 1, an example wherein the number of entries that can be stored in the FIFO is equal to maximum number of entries −1 is shown.

Further, depending upon the application of the FIFO, the FIFO controller may have Almost Full and Almost Empty signals.

The Almost Full and Almost Empty signals have the value 1 when the number of remaining empty entries is smaller than a number of entries i and the number of valid entries is smaller than a number of entries j, respectively. In order to implement the FIFO controller with this feature, suitable constants should be inputted to comparators as seen from FIG. 1.

2) FIFO with Input/Out Registers

The FIFO memory having no input register and no output register provided therefor has been described above. However, if the capacity of the memory becomes so large that a considerable time is required to write and read out data into and from the memory, then a state in which input data has to be delivered at the beginning of a cycle and read data is received at the end of the cycle becomes inevitable. Generally, in such a case, a data input register, i.e. Input Register, and a data output register, i.e. Output Register, are provided for the data input and output terminals of the memory respectively as seen in FIG. 2.

Where no such input/output registers are provided, the relationships of Write Ready=~Full and Read Ready–~Empty are satisfied. On the other hand, if the input register has valid data therein and the memory is Full while the output register is empty, the FIFO as a whole is not Full since the output register is one of entries of the FIFO. Nevertheless, the FIFO is not Read Ready. This is because the valid data in the input register cannot be transferred to the memory. Further, although the memory is not Empty, it is not Read Ready. This is because the output register has no valid data. In this instance, it is possible merely to read out data in the memory designated by the RP and transfer it to the output register. Thereafter, since one empty entry appears, the data in the input register is transferred to the memory and input data is written into the input register simultaneously. It can be noted that an ordinary memory does not allow simultaneous reading and writing from and into the same address. On the other hand, an ordinary register allows simultaneous reading and writing.

Accordingly, for a FIFO that includes an input register and an output register, logic for generating Write Ready and Read Ready signals must be prepared separately. (In FIG. 2, the logic is included in the FIFO controller.)

Further, in order to generate Almost Full and Almost Empty signals, it is necessary to acquire the number of valid entries in the FIFO. However, with the FIFO having input/output registers, the number of valid entries cannot be obtained correctly by mere subtraction of RP from WP (WP-RP). The number of pieces of valid data in the input/output registers must also be taken into account.

In particular, let logical values of the propositions 'The input register has valid data' and 'The output register has valid data' be represented by IR and OR, respectively. In this case, the total number of valid entries in the FIFO must be determined in accordance with the following:

Total number of valid entries in FIFO=(the number of valid entries in memory+IR+OR)

This can be achieved, as seen from FIG. 2, by adding two adders to the FIFO controller shown in FIG. 1.

It is to be noted that the output terminals for signals indicating the Full and Empty states of the FIFO controller shown in FIG. 1 are not provided in the FIFO controller shown in FIG. 2.

However, generation of Write Ready and Read Ready described above relates to Full and Empty states of entries in the memory, and they must be generated by a similar means to that of the FIFO controller of FIG. 1. Comparators for generation of the signals are shown also in FIG. 2.

As described above, the status signals (Full, Empty, Almost Full and Almost Empty) of the FIFO are produced by subtraction (addition) and comparison. The control logic (Controller in FIG. 2) in the FIFO controller produces control signals for production of a next status based on the current status and inputs (Write Enable and Read Enable) thereto. Updating of the WP and the RP is controlled by signals produced at this time.

Accordingly, a path that begins with operations to refer to the WP and the RP and ends with operations to update the WP and the RP is present as shown in FIG. 3, and this becomes a critical path, i.e. a maximum delay path, in the FIFO controller.

Meanwhile, a FIFO status signal is also referred to by an external apparatus connected to the FIFO. A status signal of the FIFO may relate to updating of a register in a logic circuit of an external apparatus as seen from FIG. 4 or FIG. 5, and this may probably make a critical path. It is to be noted that FIG. 4 shows a FIFO controller for a FIFO with no input/output registers while FIG. 5 shows a FIFO controller for a FIFO with input/output registers.

A feature common to the arrangements shown in FIGS. 3, 4 and 5 is a path up to production of a FIFO status signal. The conventional FIFO controllers have a problem in that, since a plurality of steps including subtraction (addition) and comparison are involved, a long delay time is entailed.

Particularly where a critical path of the entire apparatus is a path for referring to a FIFO of an apparatus outside the FIFO, a status signal of the FIFO must be generated as fast as possible, and it is desirable that a status signal of the FIFO be updated at the beginning of a clock cycle.

SUMMARY OF THE INVENTION

It is thus an object of the present invention to provide a synchronized FIFO memory circuit of the random access memory type wherein a circuit configuration of a FIFO controller is improved by reducing the length of a critical path in the FIFO controller to raise the operating speed of the FIFO controller itself, thereby to increase the operating speed of the entire FIFO memory.

In order to attain the object described above, according to an aspect of the present invention, there is provided a synchronized FIFO memory circuit that includes a random access memory and a FIFO controller, comprising a first counter for counting a number representing a Read Pointer, a second counter for counting a number representing a Write Pointer, a third counter for holding and managing the number of remaining empty entries of the FIFO memory circuit, and comparison means for comparing a value of the third counter with a constant value to produce status signals of the FIFO memory circuit, namely, Write Ready, Read Ready, Full, Empty, Almost Full and Almost Empty at a high speed.

According to another aspect of the present invention, there is provided a synchronized FIFO memory circuit that includes a random access memory and a FIFO controller, comprising a first counter for counting a number representing a Read Pointer, a second counter for counting a number representing a Write Pointer, a third counter for holding and managing the number of valid entries in the FIFO memory circuit, and comparison means for comparing a value of the third counter with a constant value to produce status signals of the FIFO memory circuit, namely, Write Ready, Read Ready, Full, Empty, Almost Full and Almost Empty at a high speed.

Each of the synchronized FIFO memory circuits described above may comprise, in place of the comparison means, one or a plurality of status look-ahead means for comparing the value of the third counter with the constant value to determine the status signals of the FIFO memory circuit, namely, Write Ready, Read Ready, Full, Empty, Almost Full and Almost Empty for a t-th cycle within a (t−1)-th cycle and to output the status signals at the beginning of the t-th cycle.

BRIEF DESCRIPTION OF THE DRAWINGS

FIG. 2 consisting of FIGS. 2A through 2B is a block diagram showing another typical configuration of the conventional synchronized FIFO memory circuit;

FIG. 12 is a diagrammatic view showing an external critical path of the embodiment shown in FIG. 7.

DETAILED DESCRIPTION OF THE PREFERRED EMBODIMENTS

Figure 1:
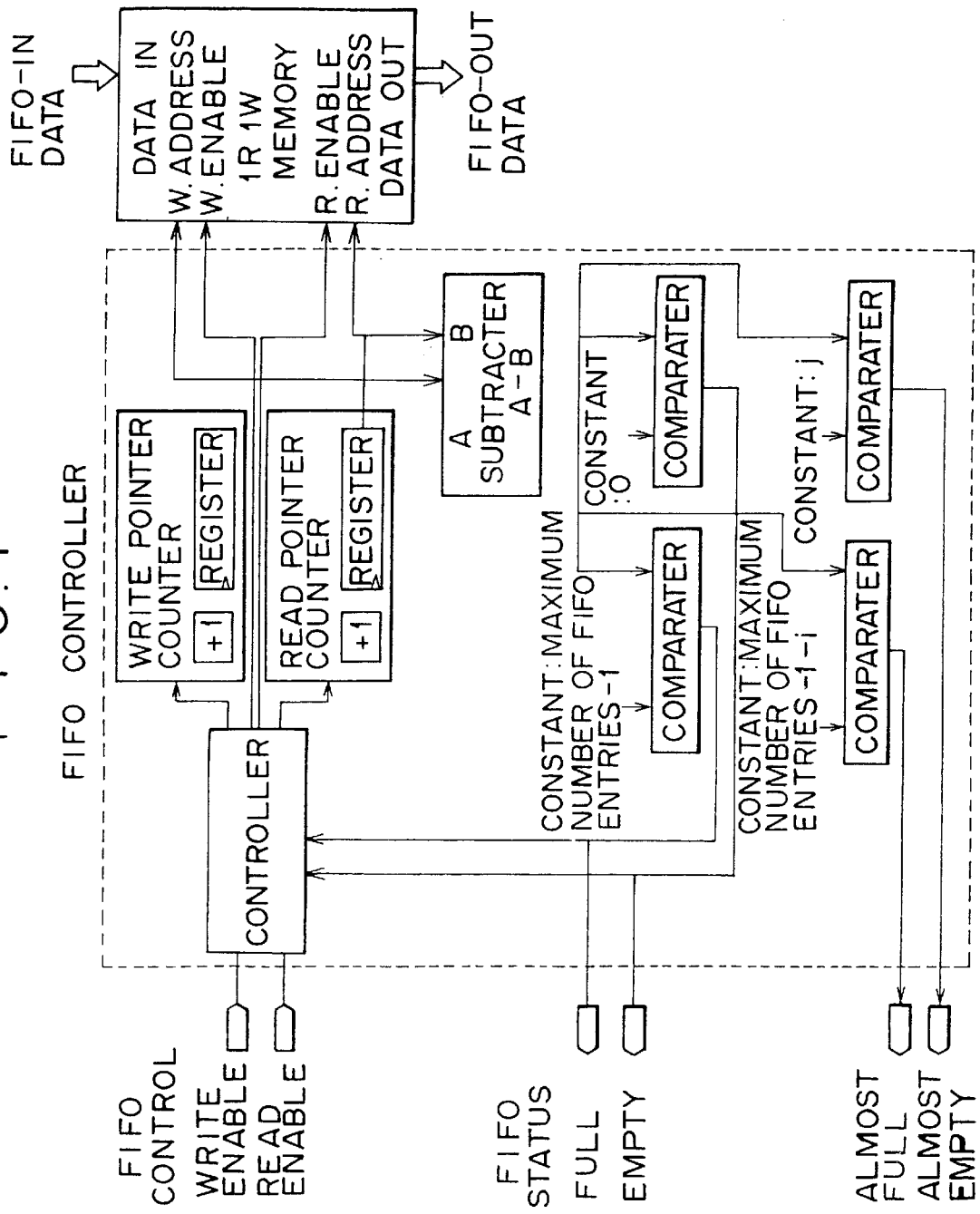
FIG. 1 is a block diagram showing a typical configuration of a conventional synchronized FIFO memory circuit.

The FIFO memory circuit provided by the present invention is explained in detail by referring to the accompanying diagrams.

It is an object of the present invention to provide a synchronized FIFO of the random access memory type with an improved circuit configuration of the FIFO controller thereof, a shortened critical path in the FIFO controller, an increased operating speed of the FIFO controller itself and an increased operating speed of the FIFO as a whole.

1) As a First Measure to Achieve the Object Described Above, According to the Present Invention, a Third Counter is Provided For example, a third counter (with the WP counter and the RP counter referred to as the first and second counters) for holding and managing the number of valid entries in the FIFO is provided. By provision of the third counter, a plurality of steps of subtraction (addition) and comparison can be realized only by the step of comparison, and consequently, the length of a critical path in the FIFO can be reduced.

As an alternative, a counter for holding and managing the number of remaining empty entries in the FIFO may be provided as the third counter. If the manner of comparison and the constant are selected suitably, then the third counter for managing the number of valid entries is virtually equivalent to the third counter for holding and managing the number of remaining empty entries. While the counters for the WP and the RP are cyclic up counters (in which the count value returns to 0 next to the maximum value) and are reset to 0, an up/down reversible counter that does not operate cyclically is employed for the third counter. The value to be used as the reset value is 0 in the case of a third counter for holding the number of valid entries, but is the total number of FIFO entries in the case of a third counter for holding the number of remaining empty entries.

The control for the third counter is performed such that, when there is a data input and there is no data output,
the third counter is incremented by one if the counter holds the number of valid entries, or
the third counter is decremented by one if the counter holds the number of remaining empty entries; but when there is no data input and there is a data output,
the third counter is decremented by one if the counter holds the number of valid entries, or
the third counter is incremented by one if the counter holds the number of remaining empty entries; but otherwise when there are a data input and a data output or there is no data input and no data output,
the third counter sustains its current condition without regard to whether the counter holds the number of valid entries or the number of remaining empty entries.

Since the number of valid entries or the number of remaining empty entries is held and managed by the third counter in this manner, by referring to the value of the third counter and comparing the value of the counter with a constant, status signals can be produced without performing subtraction or addition.

2) As a Second Countermeasure to Achieve the Object Described Above, According to the Present Invention, Status Look-ahead Logic is Used The variation in value of the third counter upon updating of the status is one of +1, −1 and 0, and the tendency of the variation becomes clear in the course of a cycle. Therefore, from the value of the third counter in the (t−1)-th cycle and a tendency of the variation that becomes clear within the (t−1)-th cycle, the value of the third counter for the t-th cycle can be obtained within the (t−1)-th cycle.

By applying this and using criteria that will be hereinafter described, the value of a status signal to be outputted in the t-th cycle can be estimated within the (t−1)-th cycle. A logic circuit that realizes this is called status look-ahead logic. Then, by updating the status signal and holding the updated signal by means of a register, the status signal can be outputted at the beginning of the t-th cycle.

In the following, a function of the status lookahead logic is described in connection with an example wherein the third counter holds and manages the number of remaining empty entries and the FIFO is in the condition of Almost Full, that is, a condition in which the number of remaining empty entries is smaller than i. Here, the third counter is called an REC (Remaining Entries Counter), which is a counter for holding the number of remaining empty entries.

It is to be noted that the REC register's output value in the t-th cycle is represented by REC(t); the Almost Full (register) output is represented by Full(t); and an input to the Almost Full register (Almost Full value in the next cycle) is represented by Next. Further, it can be explicitly recognized that the REC register is incremented or decremented with a control signal supplied by the Controller to the REC register. Accordingly, the logical values of the following three propositions 'The REC register is incremented by one', 'The REC register is decremented by one' and 'The REC register is sustained' are represented by symbols Up, Dn and St, respectively. In the following description, the meanings of the statement "If~then~else if~then~else~", an operator && (representing logical AND) and an operator || (representing logical OR) as well as the order of precedence of these operators conform to the C language.

It is to be noted that the REC register is set to the total number of FIFO entries and the AFull register is set to 0 as the initial value.

1) At the start point of the (T−1)-th cycle
Here, the output of the REC register is updated, and REC(T−1) is outputted.
2) Within the (T−1)-th cycle
The output of the REC register is inputted to the status look-ahead logic, and Next is determined on the basis of the following criterion expressions:
. . . Criterion expression 1 . . .
   If ((REC(T−1)==I+1)&&(Dn))
   ||((REC(T−1)==i)&&(Up))
   then Next=~AFull(T−1)
   else Next=AFull(T−1)
or
. . . Criterion expression 2.1 . . .
   If (REC(T−1)==I+1)&&(Dn) then Next=1
   else if (REC(T−1)==i)&&(Up) then Next=0
   else Next=AFull(T−1)
or
. . . Criterion expression 2.2 . . .
   If (REC(T−1)==i)&&(Up) then Next=0
   else if (REC(T−1)==i+1)&&(Dn) then Next=1
   else Next=Afull(T−1)
or
. . . Criterion expression 3.1 . . .
If ((REC(T−1)<=i+1)&&(Dn))
   ||((REC(T−1)<=i)&&(St))
   ||((REC(T−1)<=i−1)&&(Up))
   then Next=1
   else Next=0
or
. . . Criterion expression 3.2 . . .
   If ((REC(T−1)<=i+1)&&(Dn))
   ||((REC(T−1)<=i)&&(St))
   ||((REC(T−1)<i)&&(Up))
   then Next=1
   else Next=0
or
. . . Criterion expression 3.3 . . .
   If ((REC(T−1)<=i+1)&&(Dn))
   ||((REC(T−1)<i+1)&&(St))
   ||((REC(T−1)<=i−1)&&(Up))
   then Next=1
   else Next=0
or
. . . Criterion expression 3.4 . . .
   If ((REC(T−1)<=i+1)&&(Dn))
   ||((REC(T−1)<i+i)&&(St))
   ||((REC(T−1)<=i)&&(Up))
   then Next=1
   else Next=0
or
. . . Criterion expression 3.5 . . .
   If ((REC(T−1)<=i+2)&&(Dn))
   ||((REC(T−1)<=i)&&(St))
   ||((REC(T−1)<=i−1)&&(Up))
   then Next=1
   else Next=0
or . . . Criterion expression 3.6 . . .
   If ((REC(T−1)<i+2)&&(Dn))
   ||((REC(T−1)<=i)&&(St))
   ||((REC(T−1)<i)&&(Up))
   then Next=1
   else Next=0
or
. . . Criterion expression 3.7 . . .
   If ((REC(T−1)<i+2)&&(Dn))
   ||((REC(T−1)<i+1)&&(St))
   ||((REC(T−1)<=i−1)&&(Up))
   then Next=1
   else Next=0
or
. . . Criterion expression 3.8 . . .
   If ((REC(T−1)<i+2)&&(Dn))
   ||((REC(T−1)<i+1)&&(St))
   ||((REC(T−1)<i)&&(Up))
   then Next=1
   else Next=0
or
. . . Criterion expression 4.1 . . .
   If ((REC(T−1)>=i+2)&&(Dn))
   ||((REC(T−1)>=i+1)&&(St))
   ||((REC(T−1)>=i)&&(Up))
then Next=0
else Next=1
or
. . . Criterion expression 4.2 . . .
   If ((REC(T−1)>=i+2)&&(Dn))
   ||((REC(T−1)>=i+1)&&(St))
   ||((REC(T−1)>i−1)&&(Up))
   then Next=0
   else Next=1
or
. . . Criterion expression 4.3 . . .
   If ((REC(T−1)>=i+2)&&(Dn))
   ||((REC(T−1)>i+1)&&(St))
   ||((REC(T−1)>=i)&&(Up))
   then Next=0
   else Next=1
or
. . . Criterion expression 4.4 . . .
   If ((REC(T−1)>=i+2)&&(Dn))
   ||((REC(T−1)>i)&&(St))
   ||((REC(T−1)>i−1)&&(Up))
   then Next=0
   else Next=1
or
. . . Criterion expression 4.5 . . .
   If ((REC(T−1)>i+1)&&(Dn))
   ||((REC(T−1)>=i+1)&&(St))
   ||((REC(T−1)>=i)&&(Up))
   then Next=0
   else Next=1
or ... Criterion expression 4.6 ...
  If ((REC(T−1)>i+1)&&(Dn))
  ‖((REC(T−1)=i+1)&&(St))
  ‖((REC(T−1)>i−1)&&(Up))
  then Next=0
  else Next=1
or
... Criterion expression 4.7 ...
  If ((REC(T−1)>i+1)&&(Dn))
  ‖((REC(T−1)>i)&&(St))
  ‖((REC(T−1)>=i)&&(Up))
  then Next=0
  else Next=1
or
... Criterion expression 4.8 ...
  If ((REC(T−1)>i+1)&&(Dn))
  ‖((REC(T−1)>i)&&(St))
  ‖((REC(T−1)>i−1)&&(Up))
  then Next=0
  else Next=1
  3) At the End of the (T−1)-th Cycle
  The value of Next is settled.
  4) At the Start Point of the T-th Cycle
  The output of the Almost Full register is updated, and the value of Next settled in 3) above is outputted.

A correct Almost Full value to be outputted in the T-th cycle is obtained at the start point of the T-th cycle in this manner. Following this, representative criterion expressions of Full and Empty as well as Almost Empty are given below. As described above, Almost Empty is a condition wherein the number of remaining empty entries is smaller than j. It is to be noted that the total number of FIFO entries is represented by N. In other words, the number of FIFO valid entries=N−REC)

... Full-criterion expression ...
  If ((REC(T−1)==i)&&(Dn))
  ‖((REC(T−1)==0)&&(Up))
  then Full_Next=~Full(T−1)
  else Full_Next=Full(T−1)
... Empty criterion expression ...
  If ((REC(T−1)==N−1)&&(Up))
  ‖((REC(T−1)==N)&&(Dn))
  then Empty_Next=~Empty(T−1)
  else Empty_Next=Empty(T−1)
... Almost Empty criterion expression ...
  If ((REC(T−1)==N−j−1)&&(Up))
  ‖((REC(T−1)==N−j)&&(Dn))
  then AEmpty_Next=~AEmpty(T−1)
  else AEmpty_Next=AEmpty(T−1)

Although modifications to the three expressions above similar to the modifications of Almost Full (criterion expressions 2.1 to 4.8) are available, they are omitted here.

1) First Embodiment

A first embodiment of the synchronized FIFO memory circuit of the present invention that employs such a third counter for holding and managing the number of remaining empty entries as described above is shown in FIG. 6.

Figure 6:
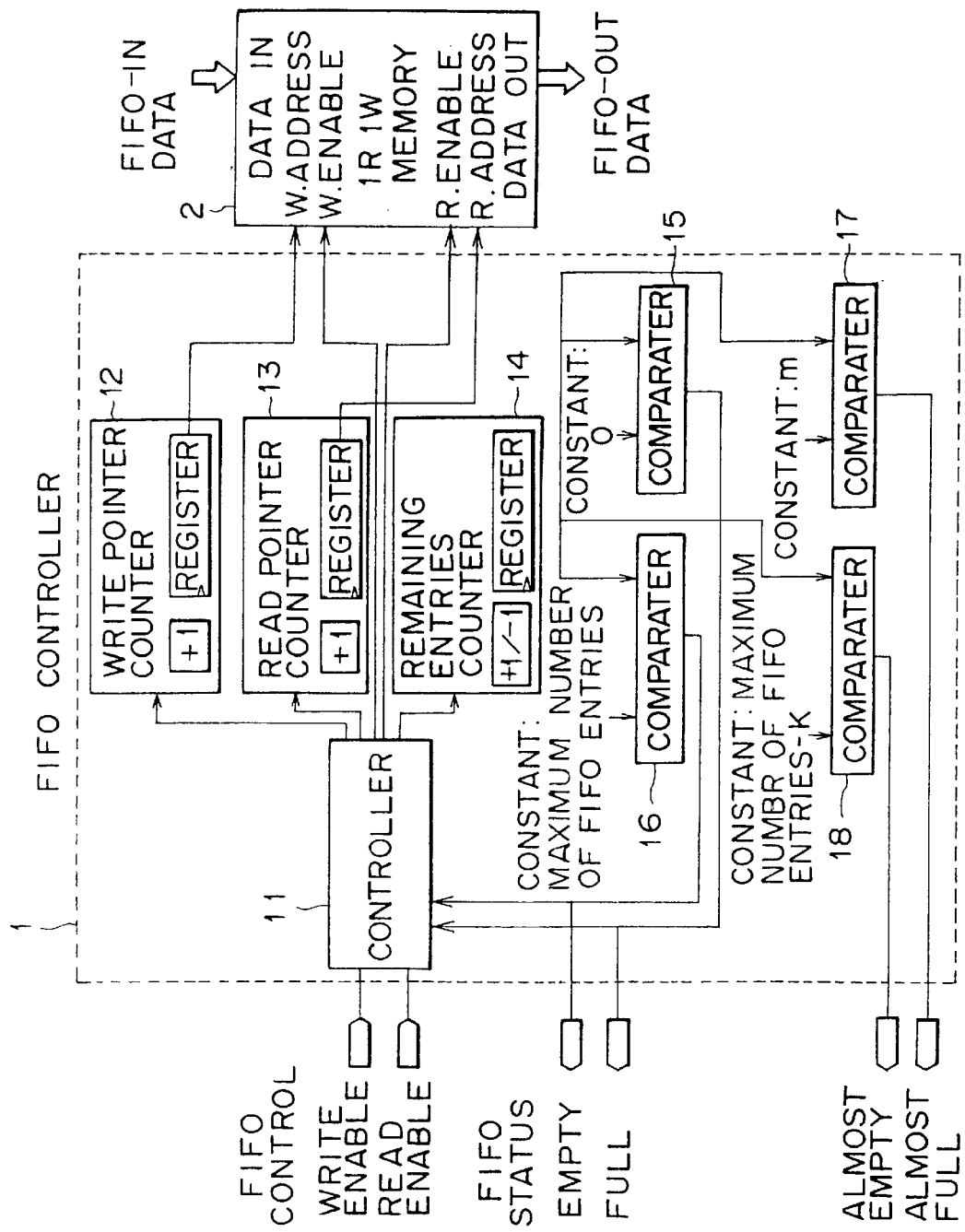
FIG. 6 is a block diagram showing a configuration of an embodiment implementing a synchronized FIFO memory circuit provided by the present invention.

Referring to FIG. 6, the cyclic FIFO memory circuit shown includes a FIFO controller 1, and a 1-Read/1-Write (1R1W) random access memory 2. The FIFO controller 1 includes a control logic circuit (Controller) 11, a Write Pointer Counter 12, a Read Pointer Counter 13, a Remaining Entries Counter 14 that serves as the third counter described above, and Comparators 15 to 18.

For simplification, in the following description, the third counter 14, which holds and manages the number of remaining empty entries, is referred to simply as an REC (Remaining Entries Counter). The REC register 14 is an up/down (reversible) counter that is set to the total number of FIFO entries as an initial value in response to a reset signal.

The Write Pointer Counter 12 and the Read Pointer Counter 13 are each a generally known up counter and each have a cyclic count value. The outputs of the Write Pointer Counter 12 and the Read Pointer Counter 13 are inputted to the random access memory (hereinafter referred to merely as a memory) 2, respectively, as a Write address and a Read address of the random access memory 2.

The control logic circuit (Controller) 11 controls the three counters 12, 13 and 14 and the memory 2 based on input signals to FIFO control input terminals (Write Enable and Read Enable) and the current status (Full or Empty). In the following, the operation of the Controller 11 is described. Here, it is assumed that status is updated on the rising edge of a clock pulse. Further, the input terminals Write Enable and Read Enable of the FIFO controller 1 are hereinafter referred to simply as WE and RE, respectively, and the input terminals Write Enable and Read Enable of the memory 2 are hereinafter referred to simply as MEM_WE and MEM_RE, respectively.

When WE==1 and the status is not Full, MEM_WE is controlled to 1 and the WP is controlled to an up mode, and on the rising edge of a clock pulse, data is stored and the WP is updated to +1. In any other combination of WE and the Full signal, MEM_WE is set to 0 and the WP maintains its current state.

When RE==1 and the status is not Empty, MEM_RE is controlled to 1 and the RP is controlled to an up mode, and on the rising edge of a clock pulse, data is read out and the RP is updated to +1. In any other combination of RE and the Empty signal, MEM_RE is controlled to 0 and the RP maintains its status.

When MEM_WE==0 and MEM_RE=1, the REC register is controlled to an up mode,
  or when MEM_WE=1 and MEM_RE==0, the REC register is controlled to a down mode,
  or in any other combination of MEM_WE and MEM_RE, the REC register maintains its current status, on the rising edge of a clock pulse.

For production of the FIFO status signals, the comparators 15 to 18 are used. The FIFO controller 1 of the present invention does not use a subtractor in order to determine the number of valid entries or the number of remaining empty entries. This is because this status is indicated by the REC register 14, that is, by the counter for holding the number of remaining empty entries.

Results of comparison of the value of the REC register 14 produced by the comparators 15 to 18 are used in the following manner to produce Full, Empty, Almost Full or Almost Empty:
  if the comparator 15 proves
  REC==0, then Full=1, but otherwise, Full=0;
  if the comparator 16 proves
  REC=(maximum number of FIFO entries), then Empty= 1, else, Empty=0;
  if the comparator 17 proves
  REC<=m (or REC<m+1), then Almost Full=1, but otherwise Almost Full=0 where Almost Full is a condition wherein the number of remaining empty entries is smaller than m; and if the comparator 18 proves REC>=(maximum number of entries −k) (or REC> (maximum number of entries −k−1)), then Almost Empty=1, else Almost Empty=0 where Almost Empty is a condition wherein the number of remaining empty entries is smaller than the number of valid entries k.

It is to be noted that m+1, (total number of entries−k) and so forth are given constants and do not signify presence of an adder or a subtractor.

2) Second Embodiment

Figure 7B:
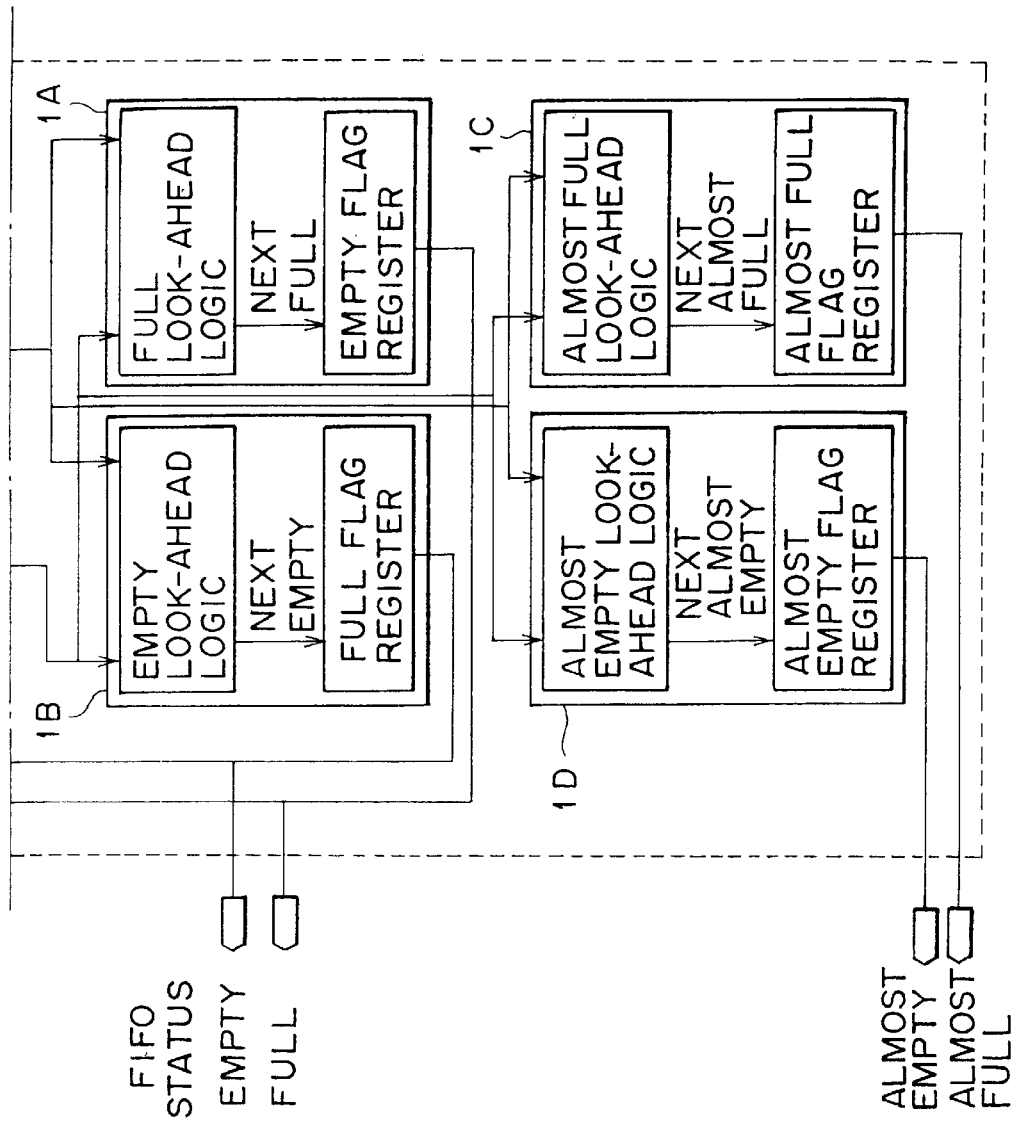
FIG. 7 consisting of FIGS. 7A through 7B is a block diagram showing a configuration of another embodiment implementing the synchronized FIFO memory circuit provided by the present invention.

A second embodiment of the synchronized FIFO of the present invention that includes a third counter for holding and managing the number of remaining empty entries and a status look-ahead logic circuit is shown in FIG. 7.

Referring to FIG. 7, the synchronized FIFO shown includes a FIFO controller 1 and a 1-Read/1-Write random access memory 2. The FIFO controller 1 includes a control logic circuit (Controller) 11, a Write Pointer Counter 12, a Read Pointer Counter 13, a Remaining Entries Counter (REC) 14, and status look-ahead logic circuits 1A to 1D.

The present embodiment is an improvement to the first embodiment described above and includes the status look-ahead logic circuits 1A to 1D (Full Look-ahead Logic, Empty Look-ahead Logic, Almost Full Look-ahead Logic and Almost Empty Look-ahead Logic and their respective registers) in place of the comparators 15 to 18 shown in FIG. 6.

The controlling manners of the three counters 12, to 14 and the memory 2 by the control logic circuit (Controller) 11 are similar to those in the first embodiment.

A control signal to the third counter (REC) 14 outputted from the control logic 11 is supplied also to the status look-ahead logic circuits 1A to 1D as described in detail hereinabove. Status signals are produced by the status look-ahead logic circuits 1A to 1D and outputted upon updating of the registers.

3) Third Embodiment

In the first and second embodiments described above, the FIFO circuits that do not include input/output registers are described. The present invention employs a third counter and a status look-ahead logic circuit that are effective for a FIFO that includes input/output registers. An arrangement that corresponds to the conventional FIFO with input/output registers described hereinabove with reference to FIG. 2 is shown in FIG. 8.

Figure 8A:
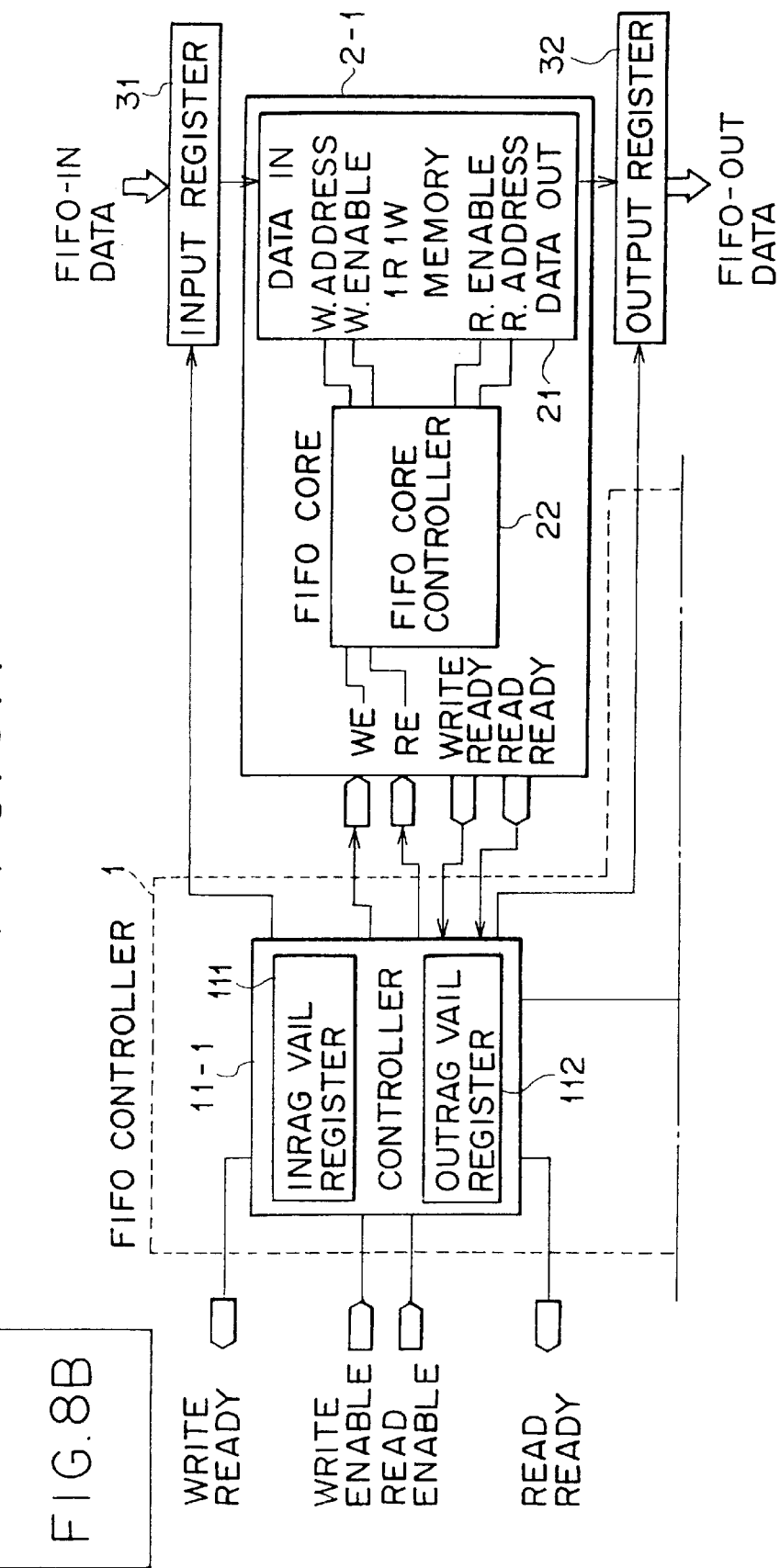
FIG. 8 consisting of FIGS. 8A through 8B is a block diagram showing a configuration of a further embodiment implementing the synchronized FIFO memory circuit provided by the present invention.
Figure 8B:
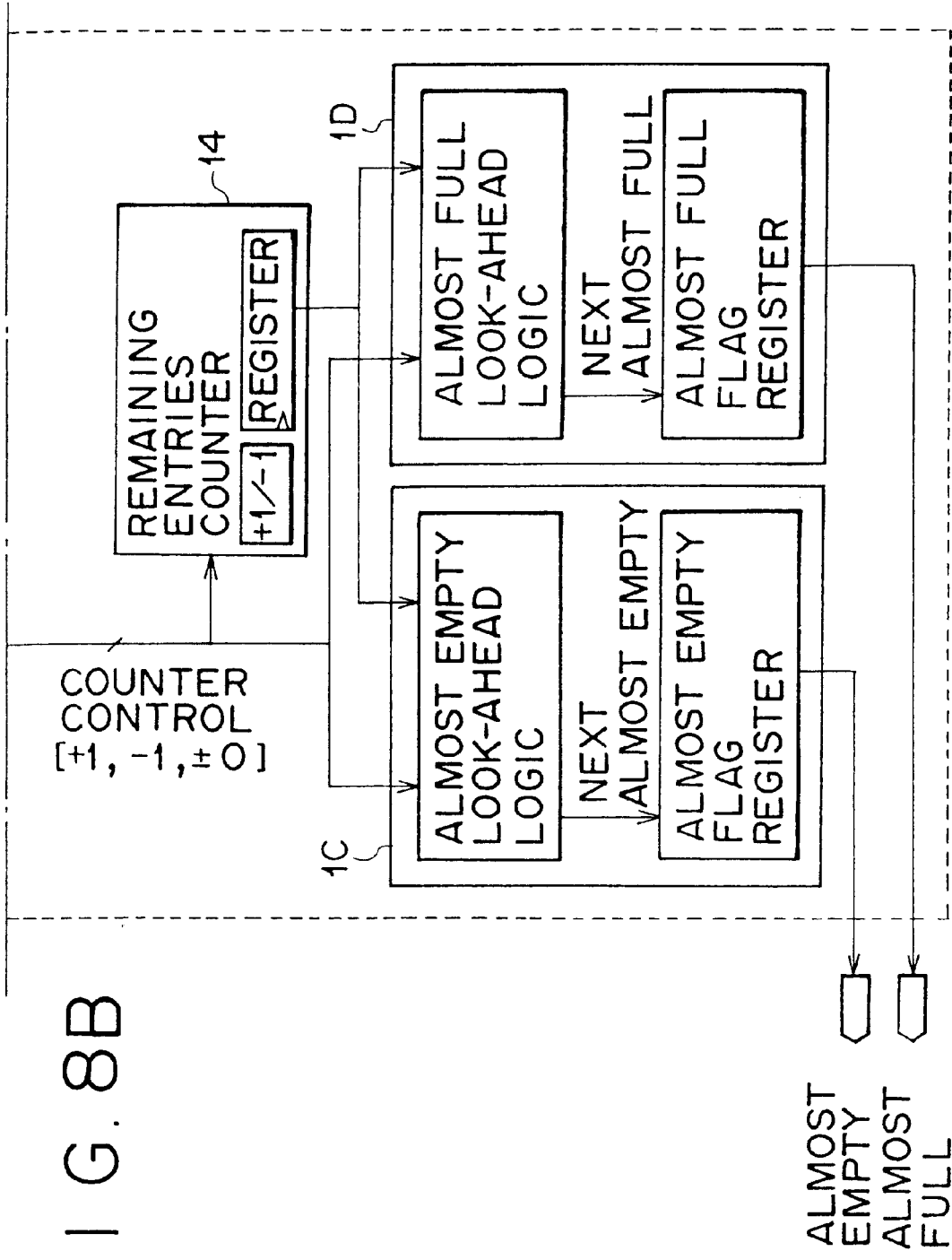

Referring to FIG. 8, the FIFO circuit shown includes a FIFO controller 1, and a FIFO core 2-1. The FIFO controller 1 includes a control logic circuit (Controller) 11-1, a third counter (Remaining Entries Counter) 14, and status look-ahead logic circuits 1C and 1D. The FIFO core 2-1 includes a 1-Read/1-Write random access memory 21 and a FIFO Core Controller 22. The FIFO circuit further includes an Input Register 31 and an Output Register 32.

The FIFO core 2-1 is a generally known synchronized FIFO that does not have Almost Full or Almost Empty status signals. In order to provide the FIFO circuit with a higher degree of generality, the FIFO core 2-1 is not provided with Full and Empty, but Write Ready and Read Ready as output status signals. The manner of implementation of the internal construction of the FIFO core 2-1 is not limited particularly. Elements that relate to the Almost Full and Almost Empty signals in the synchronized FIFO of the prior art or the FIFO of the second embodiment of the present invention may be deleted whereas ~Full may be replaced by Write Ready and ~Empty may be replaced by Read Ready. However, since the object of the present invention resides in implementation of a high speed FIFO, preferably, Write Ready and Read Ready are provided as register outputs.

The FIFO controller 1 in FIG. 8 includes, similarly to the first and second embodiments, the third counter (the counter REC for holding the number of remaining empty entries in this case) 14 and the status look-ahead logic circuits 1C and 1D (Almost Full Look-Ahead Logic and Almost Empty Look-Ahead Logic).

From FIFO control inputs (WE and RE) and status signals (Write Ready and Read Ready) of the FIFO Core, the control logic circuit (Controller) 11-1 outputs WE and RE control signals (denoted by Core_WE and Core_RE, respectively) to the FIFO core 2-1, a control signal (+1, −1 or 0) to the REC register 14, and Enable control signals (denoted by InReg_WE and OutReg_WE) to the Input Register 31 and the Output Register 32 respectively.

Further, the control logic circuit (Controller) 11-1 includes and manages an InReg Avail Register 111 and an OutReg Avail Register 112 each in the form of a 1-bit register representing whether or not valid data is present in the Input Register 31 and the Output Register 32, respectively. A manner in which the control signals are produced is hereinafter described.

It is assumed here that the output status signals (Write Ready and Read Ready: hereinafter referred to merely as Core_WRD and Core_RRD) of the FIFO core 2-1 are register outputs and are updated at the beginning of a cycle. Values of them in the t-th cycle are represented by Core_WRD(t) and Core_RRD(t), respectively. Further, values of the InReg Avail Register 111 and the OutReg Avail Register 112 in the t-th cycle are represented by IR-Avail(t) and OR_Avail(t), respectively, and the initial values of them upon resetting are both zero. Furthermore, the initial value of the REC register 14 upon resetting is the total number of FIFO entries, that is, the total number of entries in the FIFO core 2-1+2.

Further, updating of a register is represented in the following description by the symbol [:=].

IR_Avail(t), that is, a flag indicating whether or not the Input Register 31 contains valid data, is produced as follows:

If (WE) then IR_Avail_Next=1 else if (Core_WRD(t−1)) then IR_Avail_Next=0 else IR_Avail_Next=IR_Avail(t−1) to obtain the value for the next cycle IR_Avail_Next within the (t−1)-th cycle, and IR_Avail(t):=IR_Avail_Next to allow IR_Avail_Next to be outputted at the beginning of the next cycle.

Core_WE, that is, a control signal regarding a write operation into the FIFO core 2-1, is produced as follows:

If (IR_Avail(t)&&Core_WRD(t))

then Core_WE=1 else Core_WE=0 to determine whether or not data should be written upon updating of the next cycle.

InReg_WE, that is, an enable signal of the Input Register 31, is produced as follows:

If (~WE) then InReg_WE=0 else if (Core_WRD(t)||~IR_Avail(t))

then InReg_WE=1 else InReg_WE=0 to determine whether or not data should be stored into the Input Register 31 at updating in the next cycle.

WRD, that is, a status signal representative of whether or not writing into the FIFO is enabled, is produced as follows:

WRD=~IR_Avail(t)||Core_WRD(t) and, and this is outputted within the t-th cycle.

OR-Avail(t), that is, a flag indicating whether or not the Output Register 32 contains valid data, is produced as follows:

If (Core_RRD(t−1)) then OR_Avail_Next=1 else if (RE) then OR_Avail_Next=0 else OR_Avail_Next=OR_Avail(t−1) to obtain the value of the next cycle within the (t−1)-th cycle, and OR_Avail(t):=OR_Avail_Next to allow OR_Avail_Next to be outputted at the beginning of the next cycle.

Core_RE, that is, a read request to the FIFO core 2-1, is produced as follows:

If (~OR_Avail(t))||(RE && OR_Avail(t))

then Core_RE=1 else Core_RE=0 to determine whether or not data should be read out at updating in the next cycle.

OutReg_WE, that is, an enable signal for the Output Register 32, is produced as follows:

if (Core_RE&&Core_RRD(t))

then OutReg_WE=1 else OutReg_WE=0 to determine whether or not data should be fetched at updating in the next cycle.

RRD, that is, a status signal representative of whether or not reading of the FIFO is enabled, is produced as follows:

RRD=OR_Avail(t) and this is outputted within the t-th cycle.

Control for the REC register 14 is produced as follows:

If (InReg_WE&&~(OR_Avail(t)&&RE)

then the REC register should be set to the −1 mode else if (~InReg_WE&&(OR_Avail(t)&&RE)

then the REC register should be set to the +1 mode else the REC register should be controlled to the present-state sustaining mode.

Production of Almost Full and Almost Empty is the same as what was described hereinabove.

Figure 3:
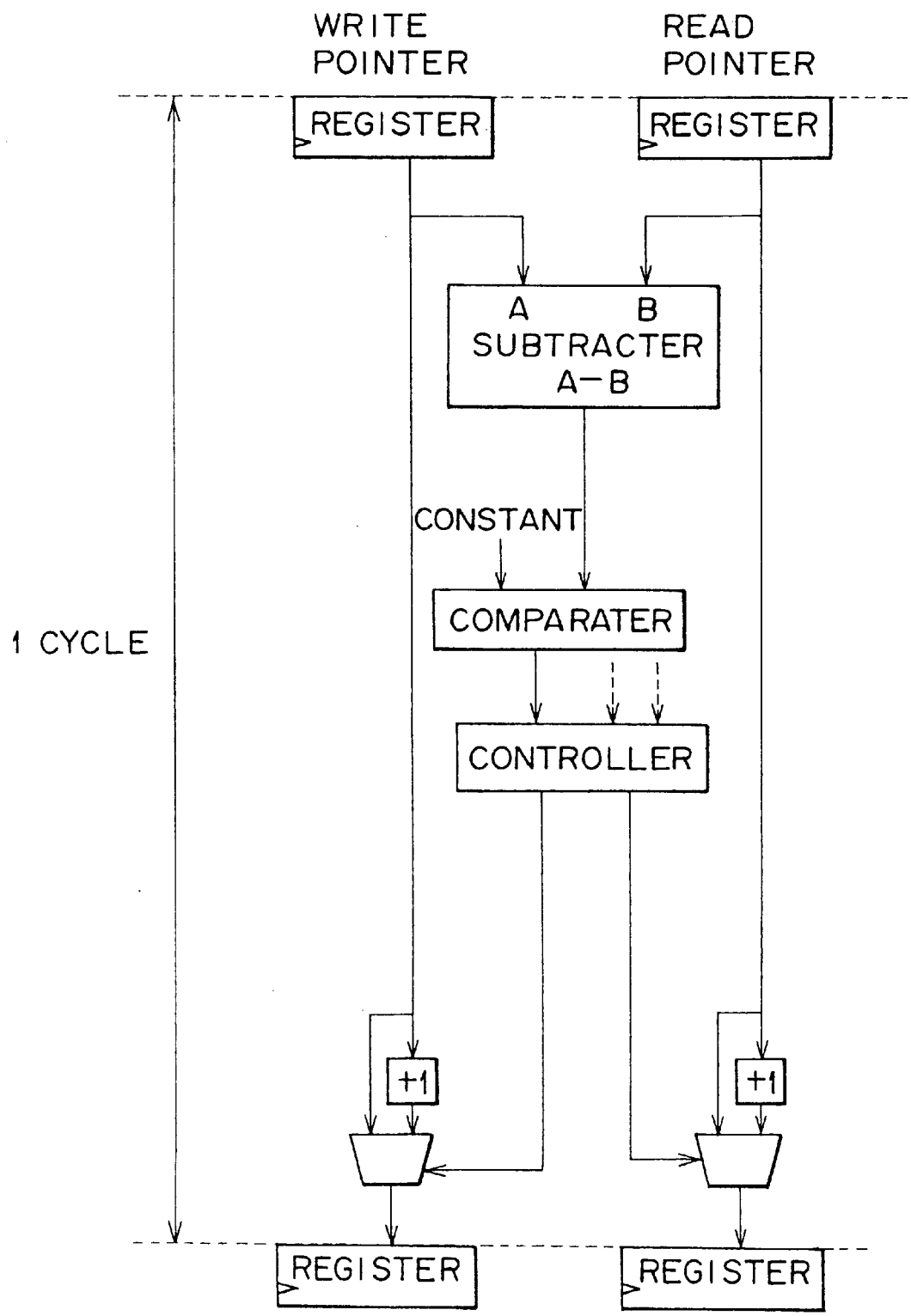
FIG. 3 is a diagrammatic view showing an internal critical path of the conventional example of FIG. 1.
Figure 4:
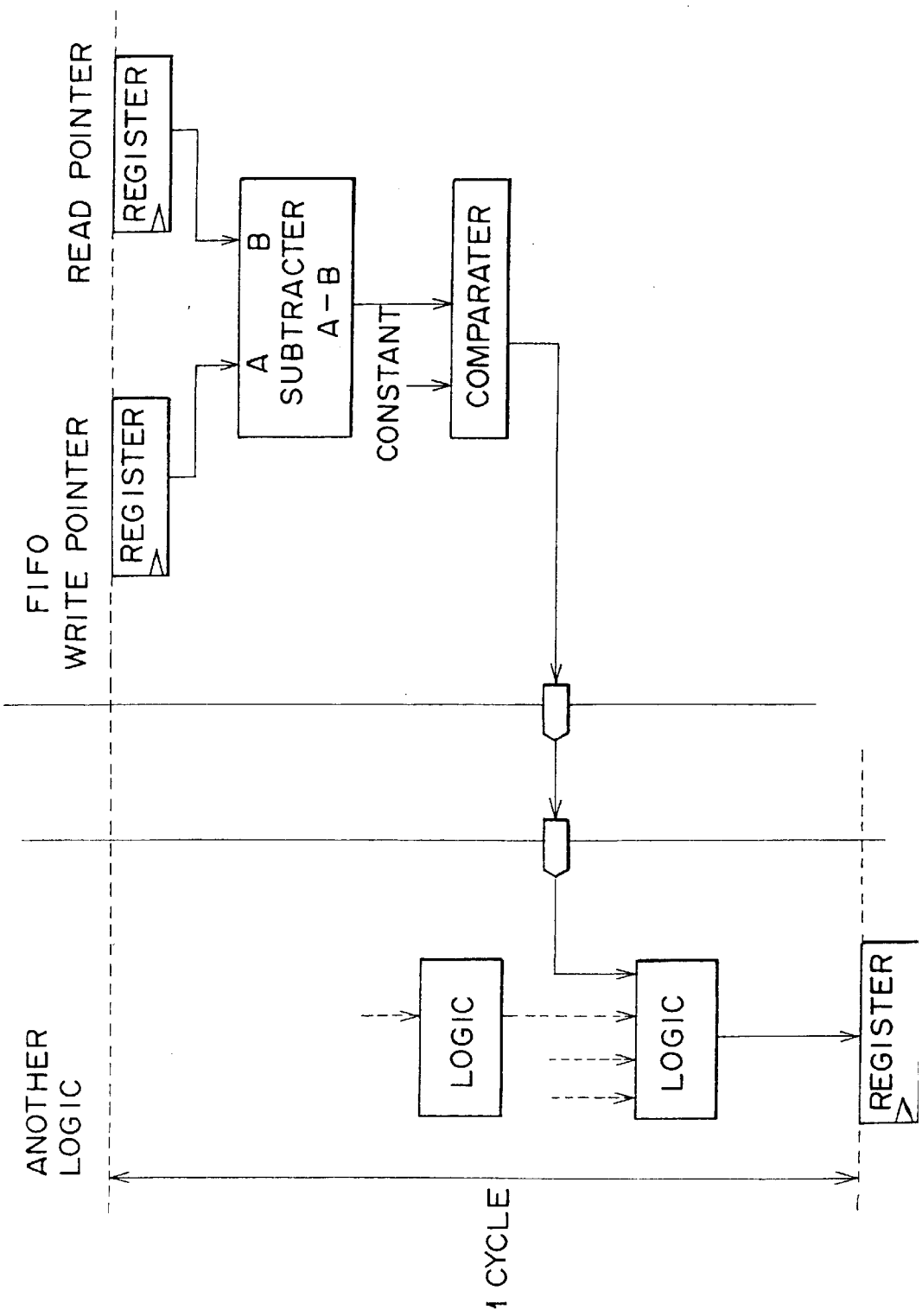
FIG. 4 is a diagrammatic view showing an external critical path of the conventional example of FIG. 1.
Figure 5:
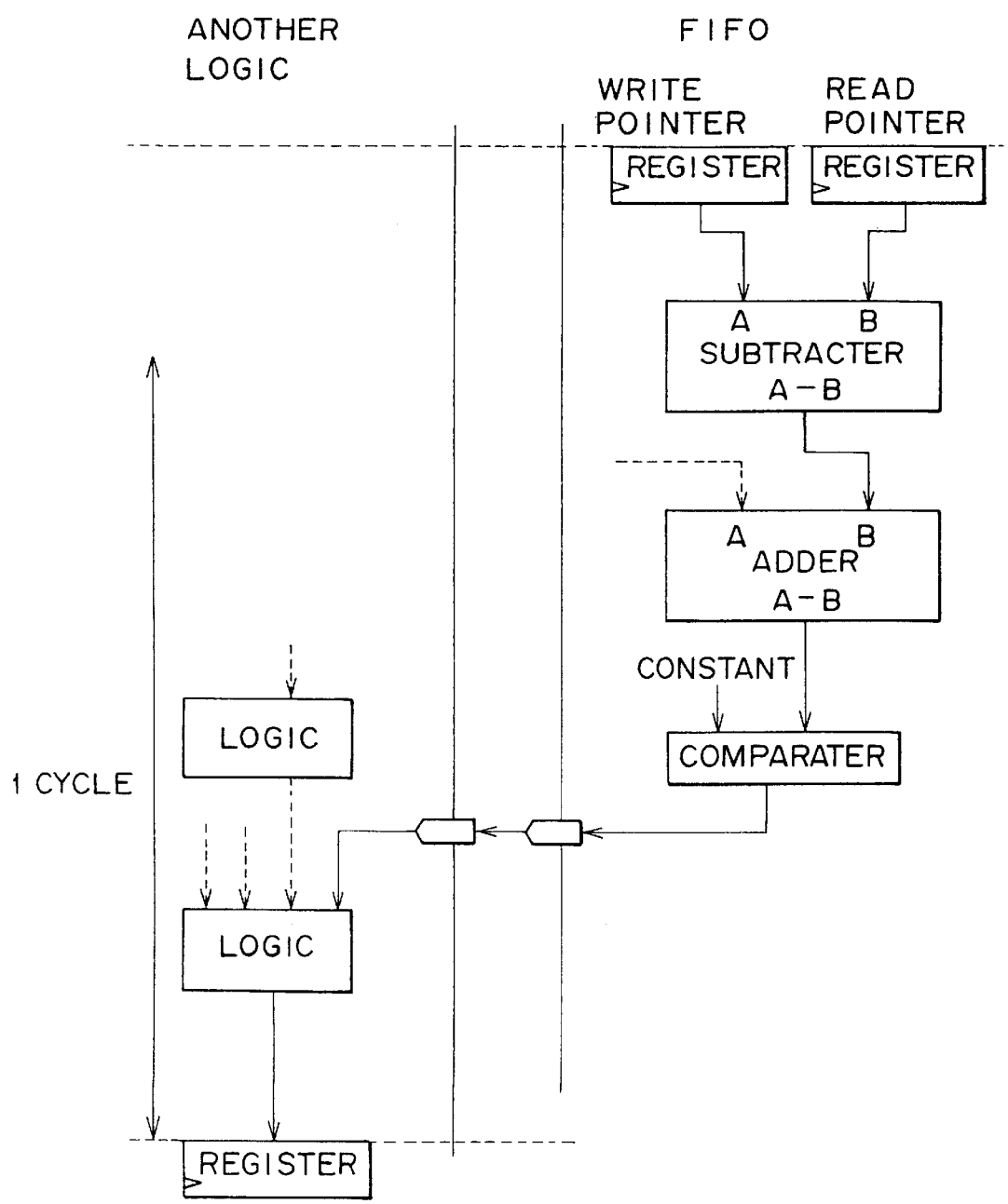
FIG. 5 is a diagrammatic view showing an external critical path of the conventional example of FIG. 2.
Figure 9:
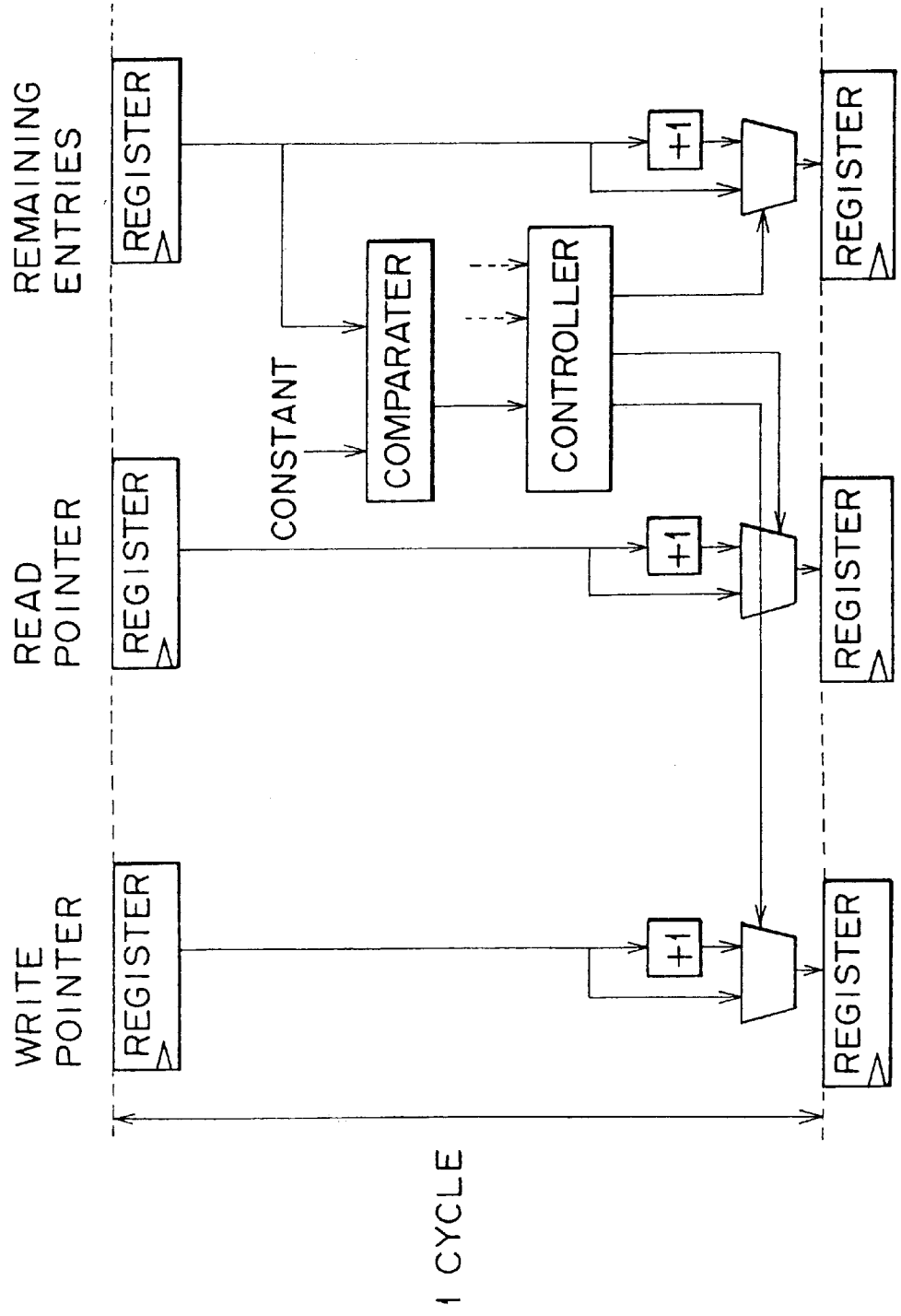
FIG. 9 is a diagrammatic view showing an internal critical path of the embodiment shown in FIG. 6.
Figure 10:
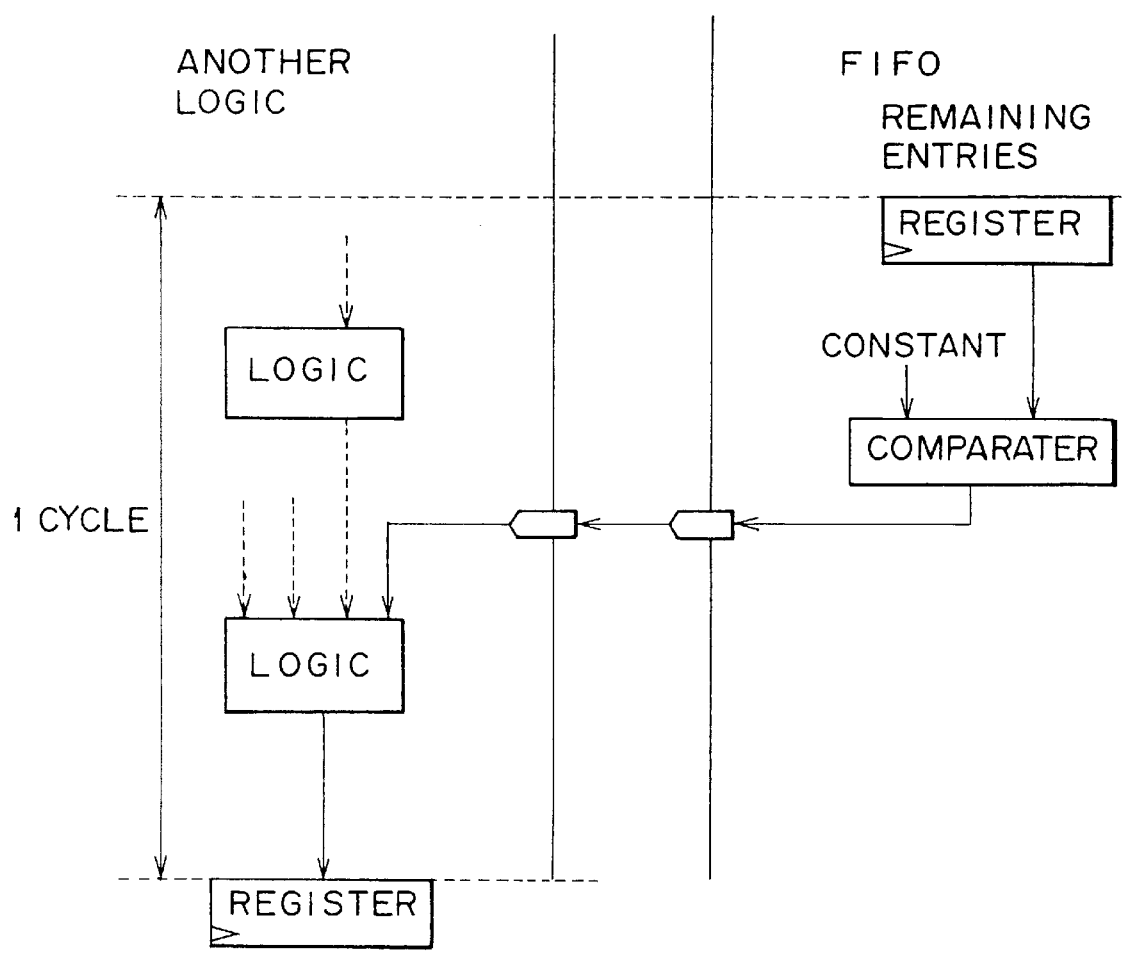
FIG. 10 is a diagrammatic view showing an external critical path of the embodiment shown in FIG. 6.

A critical path in the FIFO controller in the first embodiment described hereinabove is shown in FIG. 9, and a critical path outside the FIFO controller is shown in FIG. 10. It can be apparently seen that, when compared with those of the conventional arrangement (FIGS. 3 and 4), a status signal can be produced without using a subtractor, and the critical paths are reduced in length.

Figure 11:
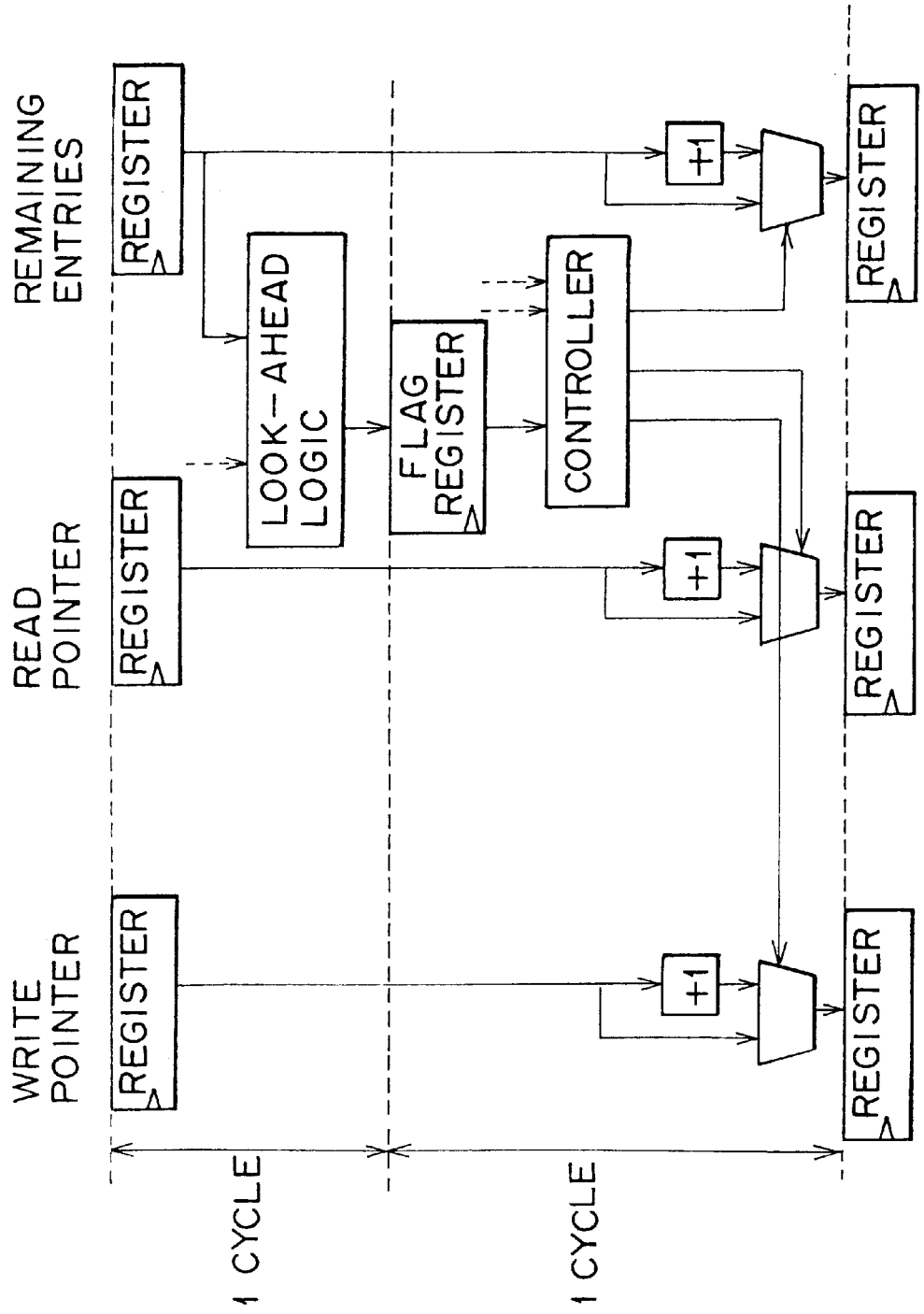
FIG. 11 is a diagrammatic view showing an internal critical path of the embodiment shown in FIG. 7.

Meanwhile, a critical path in the FIFO controller in the second embodiment described hereinabove is shown in FIG. 11, and a critical path outside the FIFO controller is shown in FIG. 12. In FIG. 11, the critical path is divided into two cycles. Although determination of which one of them is the dominant path relies upon a method of implementation of the logic, they exhibit such sufficiently short delays that it is not probably suitable to call any one of them a critical path. In FIG. 12, as discussed above, the status signal is given as a register output, and the critical path present outside the FIFO is apparently reduced in length.

In the third embodiment, since status look-ahead logic is utilized and each status signal is given as a register output similarly to the second embodiment, the critical paths are considered to be similar to those in the second embodiment. Since a conventional FIFO with input/output registers requires the three steps of subtraction, addition and comparison in order to produce Almost Full and Almost Empty, the effects of the third embodiment are greater than those of the first and second embodiments.

As is apparent from the foregoing description, according to the present invention, by employing a third counter for holding and managing the number of valid entries or the number of remaining empty entries and status look-ahead logic, each FIFO status signal can be generated at a high speed, and the operating frequency of the FIFO controller, the operating frequency of the FIFO itself and the operating frequency of the entire system including the FIFO can be augmented.

The first and second embodiments do not include input/output registers while the third embodiment includes input/output registers. The REC register (with a reset value equal to the number of remaining empty entries) is equal to the total number of FIFO entries for the former, but is equal to (the maximum number of FIFO entries +2) for the latter.

A FIFO that includes an input register but does not include an output register and another FIFO that does not include an input register but includes an output register also seem possible. In both cases, a status signal based on the REC register can be generated without any trouble if the reset value of the REC register is set to (the maximum number of FIFO entries +1).

Accordingly, as ready modifications to the third embodiment, FIFO circuits that do not include one of the input register and the output register also seem possible. Those modifications fall within the scope of the present invention.

It is described in the foregoing description that, for the third counter, a REC register that holds and manages the number of remaining empty entries is used. However, as repetitively described hereinabove, similar effects to those described hereinabove can be achieved also by an implementation wherein a counter for holding and managing the number of valid entries is used as the third counter.

Accordingly, all modifications wherein a counter for holding and managing the number of valid entries is used as the third counter in place of the REC register in the context above shall fall within the scope of the present invention.

What is claimed is:

1. A synchronized FIFO memory circuit including a random access memory and a FIFO controller, said circuit further comprising:

a first counter for counting a number representing a Read Pointer;

a second counter for counting a number representing a Write Pointer;

a third counter for holding and managing the number of remaining empty entries of said FIFO memory circuit; and comparison means for comparing a value of said third counter with a constant value, wherein status signals of said FIFO memory circuit, namely, Write Ready, Read Ready, Full, Empty, Almost Full and Almost Empty, are produced at a high speed by comparison carried out by said comparison means.

2. A synchronized FIFO memory circuit according to claim 1 wherein, in place of said comparison means, one or a plurality of status look-ahead means are provided for comparing a value of said third counter with said constant value to determine said status signals of said FIFO memory circuit, namely, Write Ready, Read Ready, Full, Empty, Almost Full and Almost Empty, for a t-th cycle, within a (t−1)-th cycle and output said status signals at the beginning of said t-th cycle.

3. A synchronized FIFO memory circuit according to claim 1 or 2 wherein said first and second counters are each a cyclic up counter whereas said third counter is a non-cyclic up/down counter which decrements its value by one when there is a data input and there is no data output, but increments its value by one when there is no data input and there is a data output, but maintains its value when there are a data input and a data output or when there is no data input and no data output.

4. A synchronized FIFO memory circuit including a random access memory and a FIFO controller, said circuit comprising:
   a first counter, said first counter changing a first number;
   a second counter, said second counter changing a second number;
   a third counter, third counter incrementing a value by an incrementing amount when said first number changes, third counter decrementing said value by a decrementing amount when said second number changes; and
   a status signal generator, said status signal generator outputting at least one status signal.

5. A synchronized FIFO memory circuit according to claim 4 further comprising:
   a comparator, said comparator comparing said value with a constant value to produce said at least one status signal.

6. A synchronized FIFO memory circuit according to claim 4 wherein, said at least one status signal indicates whether said FIFO memory circuit is enabled for a read operation.

7. A synchronized FIFO memory circuit according to claim 4 wherein, said at least one status signal indicates whether said FIFO memory circuit is enabled for a write operation.

8. A synchronized FIFO memory circuit according to claim 4 wherein, said at least one status signal includes Write Ready, Read Ready, Full, Empty, Almost Full and Almost Empty.

9. A synchronized FIFO memory circuit according to claim 4 wherein, said circuit further comprises:
   a control logic controller, said control logic circuit using said at least one status signal to control said random access memory and said first, second and third counters.

10. A synchronized FIFO memory circuit according to claim 9 wherein, said first counter is a cyclic up counter.

11. A synchronized FIFO memory circuit according to claim 4 wherein, said second counter is a cyclic up counter.

12. A synchronized FIFO memory circuit according to claim 4 wherein, said third counter is an up/down counter.

13. A synchronized FIFO memory circuit according to claim 12 wherein,
   said third counter decrements said value by one when there is a data input and there is no data output,
   said third counter increments said value by one when there is no data input and there is a data output,
   said third counter maintains said value when there are a data input and a data output or when there is no data input and no data output.

14. A synchronized FIFO memory circuit according to claim 4 wherein, paid incrementing amount is an integer, and said decrementing amount is another integer.

15. A synchronized FIFO memory circuit according to claim 14 wherein, said third counter is incremented by 1, 1 being said incrementing amount, and said third counter is decremented by 1, 1 being said decrementing amount.

16. A synchronized FIFO memory circuit according to claim 4 wherein, said random access memory includes a plurality of entries.

17. A synchronized FIFO memory circuit according to claim 16 wherein, said value indicates the number of empty entries of said plurality of entries.

18. A synchronized FIFO memory circuit according to claim 16 wherein, said third counter is initialized to the total number of entries of said plurality of entries.

19. A synchronized FIFO memory circuit according to claim 16 wherein,
   said first number represents a Read Pointer, said Read Pointer indicating an entry of said plurality of entries from which output data are read, and
   said second number represents a Write Pointer, said Write Pointer indicating an entry of said plurality of entries to which input data are written.

20. A synchronized FIFO memory circuit according to claim 19 wherein, said first number is a read address for said random access memory, and
   said second number is a write address for said random access memory.

21. A synchronized FIFO memory circuit according to claim 16 wherein, a valid entry is an entry of said plurality of entries in which data are stored.

22. A synchronized FIFO memory circuit according to claim 4 further comprising:
   at least one status look-ahead circuit, said at least one status look-ahead circuit comparing said value with said constant value to produce said at least one status signal.

23. A synchronized FIFO memory circuit according to claim 22 wherein, said at least one status signal includes Write Ready, Read Ready, Full, Empty, Almost Full and Almost Empty, for a t-th cycle, within a (t−1)-th cycle and output said status signals at the beginning of said t-th cycle.

* * * * *